United States Patent [19]

Kodo et al.

[11] Patent Number: 4,875,202
[45] Date of Patent: Oct. 17, 1989

[54] DISK-TYPE STORAGE MEDIUM RECORDING/REPRODUCING APPARATUS

[75] Inventors: Toshikazu Kodo, Neyagawa; Shinichi Tanaka, Kyoto, both of Japan

[73] Assignee: Matsushita Electric Industrial Co., Ltd., Osaka, Japan

[21] Appl. No.: 20,036

[22] Filed: Feb. 27, 1987

[30] Foreign Application Priority Data

Mar. 7, 1986 [JP] Japan .................................. 61-51146

[51] Int. Cl.⁴ ............................................ G11B 17/22
[52] U.S. Cl. ..................................... 369/32; 360/10.1
[58] Field of Search ..................... 358/907; 360/10.1; 369/32, 275

[56] References Cited

U.S. PATENT DOCUMENTS

| | | | |
|---|---|---|---|
| 4,361,849 | 11/1982 | Bolger | 360/10.1 |
| 4,499,505 | 2/1985 | Sugiyama et al. | 358/907 |
| 4,510,531 | 4/1985 | Sugiyama | 358/907 |
| 4,539,664 | 9/1985 | Deguchi et al. | 358/907 |
| 4,761,772 | 8/1988 | Murakami | 369/32 |

FOREIGN PATENT DOCUMENTS 115638 7/1983 Japan .

*Primary Examiner*—Peter S. Wong
*Assistant Examiner*—Jeffrey Sterrett
*Attorney, Agent, or Firm*—Wenderoth, Lind & Ponack

[57] ABSTRACT

A recording/reproducing apparatus disclosed herein uses a disk-type storage medium which has a spiral track divided into a plurality of continuous logical tracks. Each logical track extends at an angle less than 360°. A head executes a track jump for retracing a desired logical track during tracing a logical track next to the desired track. Thus, no specific retrace area is necessary to be provided on the storage medium.

8 Claims, 9 Drawing Sheets

DISK-TYPE STORAGE MEDIUM RECORDING/REPRODUCING APPARATUS

BACKGROUND OF THE INVENTION

1. Field of the Invention

The present invention relates to an apparatus for recording and reproducing a disk-type storage medium with spiral tracks and also to a format of such a storage medium.

2. Description of the Prior Art

In the disk-type storage media such optical disks, optomagnetic disks, and the like, there are known two types one having concentric tracks and the other having spiral tracks. However, due to technical difficulty for forming fine-pitch concentric tracks with high precision, the spiral track type is generally used when a large storage capacity is required in a small-sized disk.

In sequential operations performed to record and reproduce data, there is a process called "seek", which is an operation to move a head to a desired recording/reproducing position. In the case of the disk having the concentric tracks, the head is held on a track after a seek; while in the case of the disk having the spiral tracks, the head is advanced gradually toward the next track with rotation of the disk after a seek. Accordingly, for the disk having such spiral tracks, such a technique is used as returning the head to the desired track with reference to a specific signal called an "index signal". And this technique is generally called "track jump", "kick back" or "retrace".

A method of retrace is disclosed in Japanese Patent Laid-open No. 58 (1983)-115638, wherein however, no detailed description is given with respect to the problem described below.

FIG. 10 illustrates an exemplary format of a disk-type storage medium used for execution of a conventional retrace. In FIG. 10, spiral solid lines correspond to spiral tracks, and S0–S2 represent sectors shown by thick solid lines, on which data are stored. Succeeding sectors next to S2 are formed similarly up to the retrace area, but they are omitted in the figure. In this figure, one track is defined per rotation, and hereinafter it will be referred to as a "physical track".

A storage medium having the format of FIG. 10 is recorded and reproduced in the following manner. First, suppose that a target sector to be recorded or reproduced is S1 in an nth physical track (n: integer). A recording/reproducing apparatus executes the aforementioned seek for moving a head to the target sector. Completion of the seek is confirmed by reproduction of track address data stored in all sectors included in the nth physical track. After passage of the head through the rear end of the nth physical track after to completion of the seek, the head is driven to jump one track in the reverse direction so as to keep tracing the target physical track. The data of the sector S1 is recorded or reproduced by the head during tracing the nth physical track. However, the track jump at this time is limited merely to the retrace area shown in FIG. 10. An index signal for the retrace is detected from the storage medium.

As described above, in the use of a storage medium with spiral tracks, a specific retrace area is necessary in addition to the data storage area. The time required for such retrace is about 1 msec. Accordingly, in using the storage medium so formated as shown in FIG. 10, there exists a disadvantage that the area for storage of data becomes relatively smaller with increase of the disk rotation speed.

In one exemplary method for solving the above problem, the index signal is replaced by the track address data included in the content of the sector. In this method, however, there arises another problem that if a defective track exists, the track can never be traced again. This problem is rendered more conspicuous particularly when the format is not of pregroove type but soft type.

SUMMARY OF THE INVENTION:

It is an object of the present invention to provide a recording/reproducing apparatus which uses a disk-type storage medium with spiral tracks and is capable of executing accurate retrace without causing any reduction of storage capacity even at an increased rotation speed of the disk.

The storage medium employed in the present invention has a spiral track divided into a plurality of continuous logical tracks with no gaps therebetween. Each logical track extends at an angle less than 360°. The recording/reproducing apparatus of the invention is equipped with at least a head for reading out data recorded in the above-mentioned storage medium, and a track jump execution means for returning the head, after its passage through an end of a sector in a desired logical track, to trace again the desired track. That is, a retrace is executed when the head is tracing logical tracks following the desired track.

Due to the above constitution, the recording/reproducing apparatus of the invention is capable of recording data even in the area required for track jump and realizing satisfactory retrace without causing reduction of the storage capacity despite any increase of the disk rotation speed.

Preferably, the length of each logical track is 180° on the disk-type storage medium. In this case a retrace is executed when the head is tracing the logical track next to the desired track.

DESCRIPTION OF THE PREFERRED EMBODIMENTS

Figure 1:
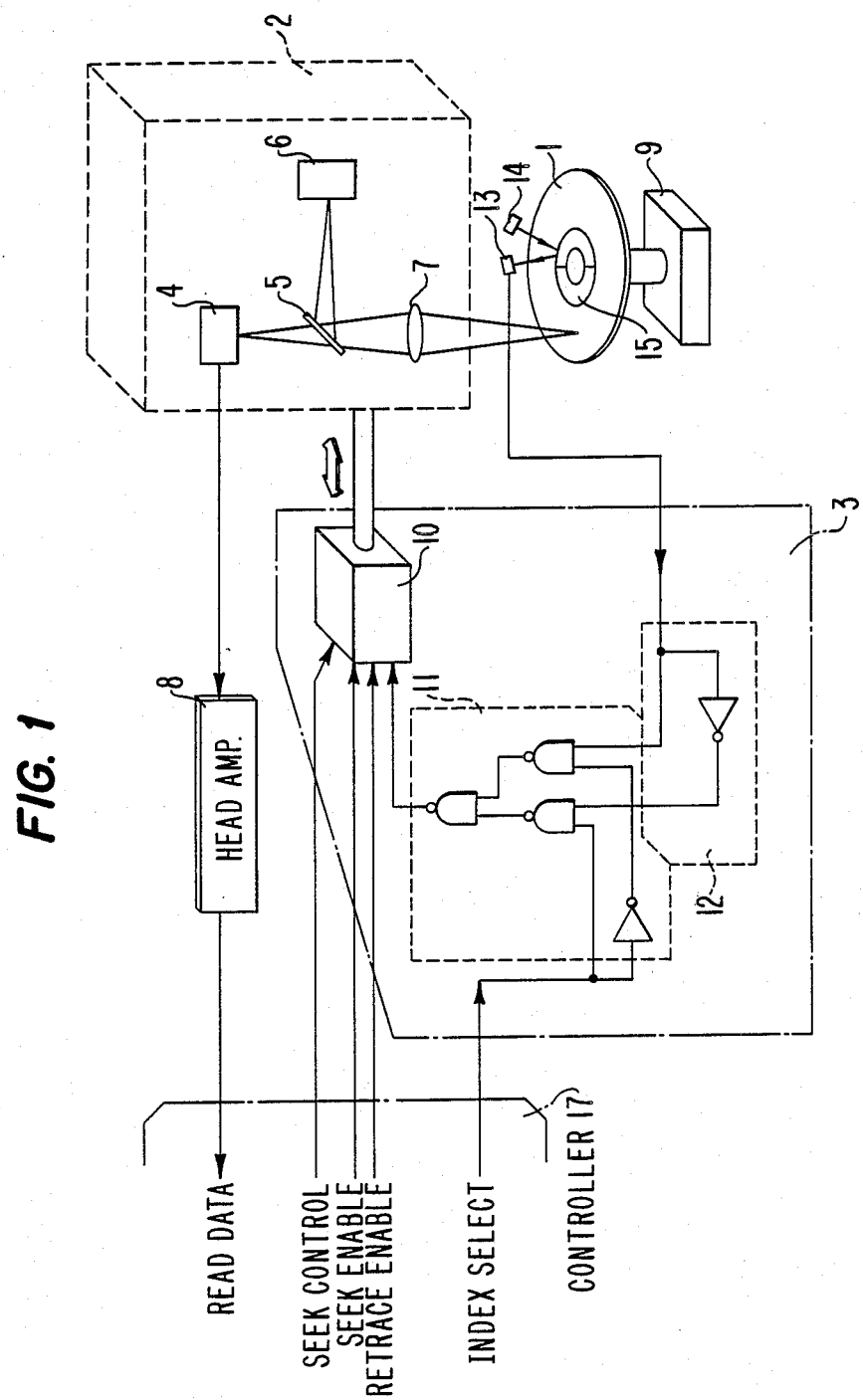
FIG. 1 is a block diagram of a disk-type storage medium recording/reproducing apparatus as a first embodiment of the present invention.

FIG. 1 is a block diagram of a disk-type storage medium recording/reproducing apparatus as a first embodiment of the present invention.

* Format

Figure 8:
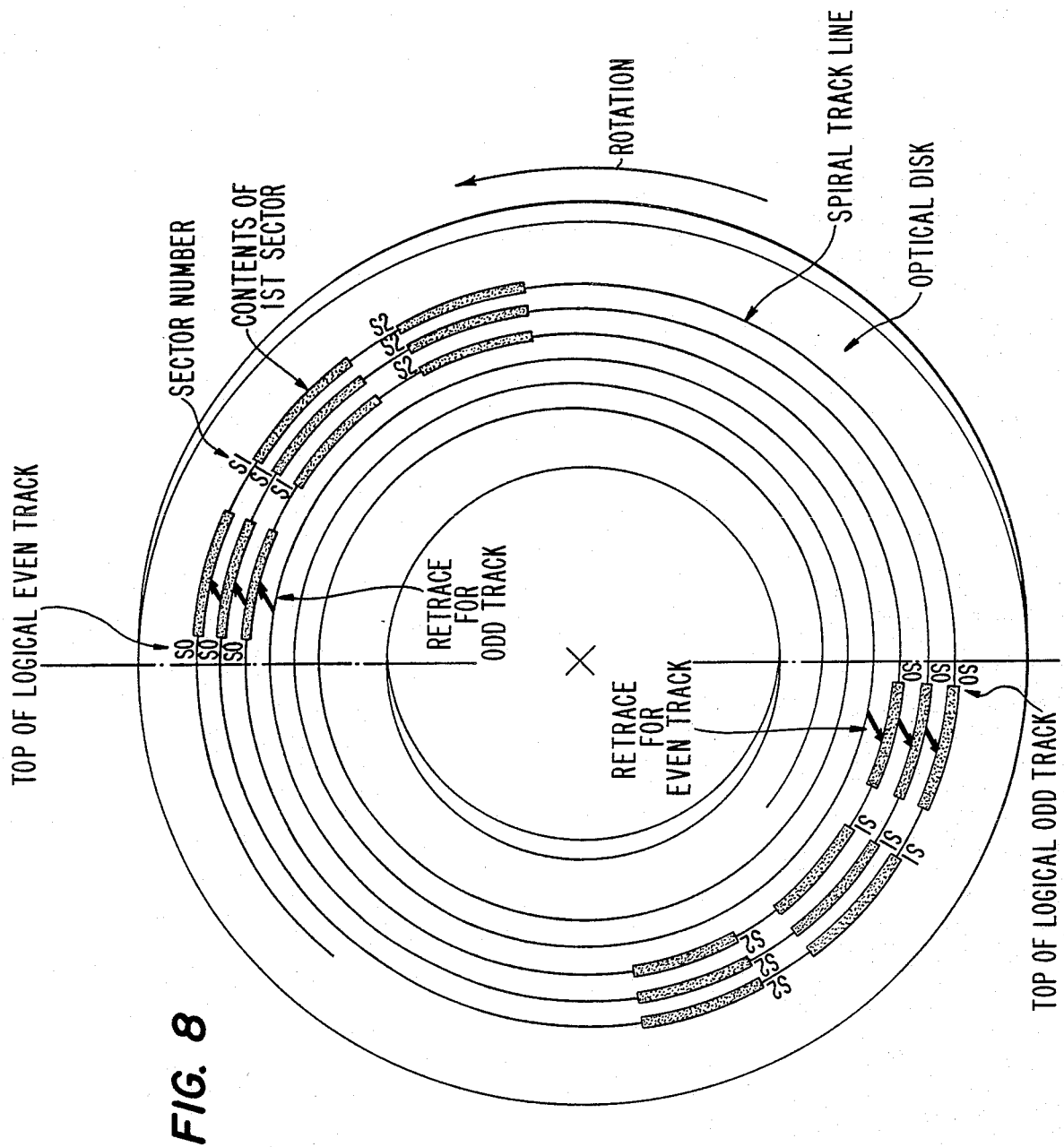
FIG. 8 illustrates an exemplary disk format of the invention used in the first and second embodiments.

In FIG. 1, denoted by 1 is a disk-type storage medium so formated as shown in FIG. 8. That is, FIG. 8 illustrates an exemplary format of the storage medium adapted for use in the embodiment of this invention, wherein a spiral solid line correspond to a spiral track divided into a plurality of continuous logical tracks each having sectors S0–S2 shown by thick solid lines. Although succeeding sectors in each logical track are formed similarly next to S2, they are omitted in the figure. An nth sector comprises an identifier area for storage of a track address, a sector number and so forth, and an area for storage of data to be recorded and reproduced. In FIG. 8, any logical track formed on the right with respect to the center of the circle is termed a "logical even track", while any logical track formed on the left is termed a "logical odd track". By thus providing two logical tracks on each physical track, extending 360°, the retrace area that has been required in the prior art heretofore is rendered no longer necessary. The reason will be described in detail later in connection with the retrace operation. * Detection of index pulse (I)

The storage medium 1 shown in FIG. 1 is removable from a spindle motor 9 which is rotated at a fixed speed. Denoted by 15 is a seal stuck to the storage medium 1 and so patterned that the logical odd tracks correspond to its white portion while the logical even tracks correspond to its black portion. There are also shown a light emitting diode 14 for irradiating light to the seal 15, and a photo cell 13 for sensing a light reflected from the seal 15. A combination of such components 13 through 15 is capable of sensing a boarder of the logical tracks, and producing a sensed signal as an index pulse.

* Record and reproduction

In FIG. 1, a head 2 comprises a photo cell 4 for converting a light which is reflected from the storage medium 1 and includes data into an electric signal, a half mirror 5 for separating the light incident upon the storage medium 1 and the light reflected therefrom, a lens 7 for converging the light onto the storage medium 1, and a laser 6 functioning as a light source. Such a head has a function of recording the data in and reproducing the same from the storage medium 1. When recording the data in the storage medium 1, the output of the laser 6 needs to be modulated by the signal including the data to be recorded, but a path of such signal is not shown here.

The data in the storage medium 1 is read out therefrom by the head 2 and is fed via a head amplifier 8 to a controller 17 which selects necessary information out of the received read data and thereby acquires materials to make various decisions in the known manner.

* Seek

Figure 2:
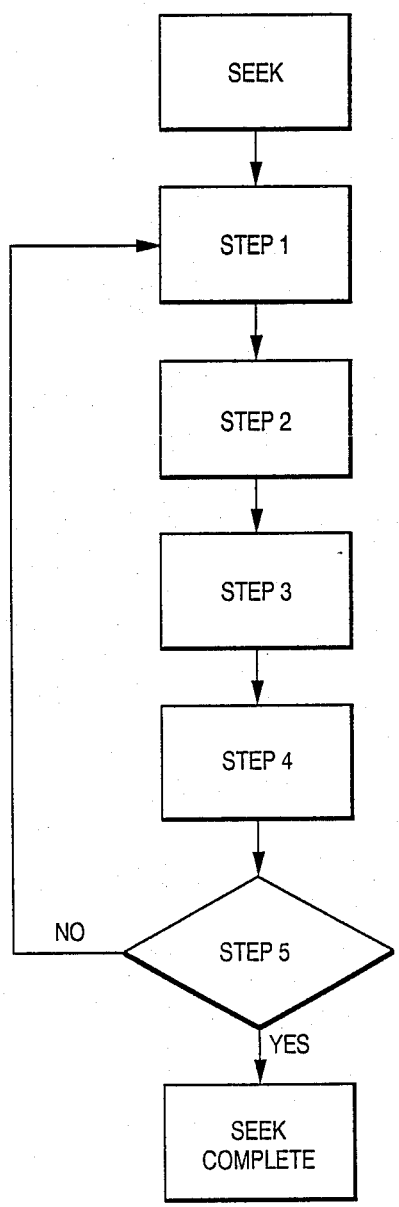
FIG. 2 is a flow chart showing the procedure of a seek operation performed in the first embodiment.

The controller 17 is composed of a microcomputer or a microcontroller using a bit slice chip, but its hardware constitution is not shown in FIG. 1. Here a description will be given merely on the control procedure which is a software in the controller 17. FIG. 2 shows an exemplary control flow chart for execution of the seek operation by the controller 17. Suppose now that the controller 17 is recognizing the current position of the head 2, i.e. the current logical track address, and the seek is limited merely to deal with a displacement from a logical even track to another logical even track or a displacement from a logical odd track to another logical odd track. When reproducing the data from a given track in such a state, the head 2 is moved by a traverse motor 10 for a distance equivalent to the difference between the current logical track address and the target logical track address. For execution of such movement, first the controller 17 switches off the retrace in step 1 in the flow chart of FIG. 2. Then the traverse motor 10 is driven in step 2 to move the head 2 for a distance equivalent to the above difference, thereby displacing the head 2 toward the target logical track address. The length of such displacement of the head 2 caused by the traverse motor 10 is generally regulated by the number of track crosses. Although this technique is adopted in FIG. 1 also, it is assumed here that, for simplifying the explanation, the length of the displacement is regulated by a seek control signal fed from the controller 17. In step 3, the retrace is switched on for enabling the head 2 to trace the given logical track. Subsequently in step 4, the logical track address is read out from the content of the sector obtained through the head 2 and the head amplifier 8. And in step 5, the current logical track address thus read out is compared with the target logical track address and, if a coincidence is attained therebetween, the process is completed. In case no coincidence is attained, the process is returned to step 1 and the foregoing procedure is repeated. Although the seek is thus completed, the method thereof is not limited to the example of FIG. 2 alone.

The process in the above individual steps corresponds to FIG. 2 as follows. Procedure of seek Step 1: The retrace is switched off so that a retrace enable line is rendered inactive.

Step 2: The traverse motor 10 is controlled by the controller 17 to displace the head 2 to the target logical track. After the seek enable line is turned active, a displacement of the traverse motor 10 is effected via a seek control line.

Step 3: The retrace is switched on, i.e., the retrace enable line is rendered active.

Step 4: The logical track address is read out from the sector content obtained through the head 2 and the head amplifier 8.

Step 5: The track address thus read out is checked if it is coincident with the target logical track address.

* Retrace

The retrace is executed by a track jump control unit 3. For driving the head 2, the traverse motor 10 is actuated as in the aforesaid seek operation. The track jump control unit 3 comprises a selector 11 and an index generator 12. When an index pulse indicative of a boarder of the logical tracks obtained from the photo cell 13 is fed to the index generator 12, there are produced two signals which correspond respectively to a change from a logical odd track to a logical even track and a change from a logical even track to a logical odd track. Then one of the two signals is selected by the selector 11 according to an index select signal from the controller 17 and is fed to the traverse motor 10. Only when the retrace enable signal fed from the controller 17 is in its on-state, the traverse motor 10 moves the head 2 by one physical track in the reverse direction with reference to the selected signal. Due to such a retrace operation, a logical odd track can be used as a retrace area when recording or reproducing a logical even track, or a logical even track can be used as a retrace area when recording or reproducing a logical odd track. Thus, in the arrangement where the retrace area is a semicircular region of the storage medium 1, the retrace can be executed with a sufficient margin even at a high rotation speed of the storage medium 1.

In the first embodiment, the timing to start the retrace is detected by reference to the seal stuck to the storage medium. This method ensures increased certainty in comparison with another method which reads out the format data by using the head 2 and generates an index signal from such format data, because in a state where the format is destructed, the retrace is rendered impossible in the latter method. Now a description will be given on a second embodiment of the invention where the component elements can be diminished in number while the certainty of the retrace is still maintained.

Figure 3:
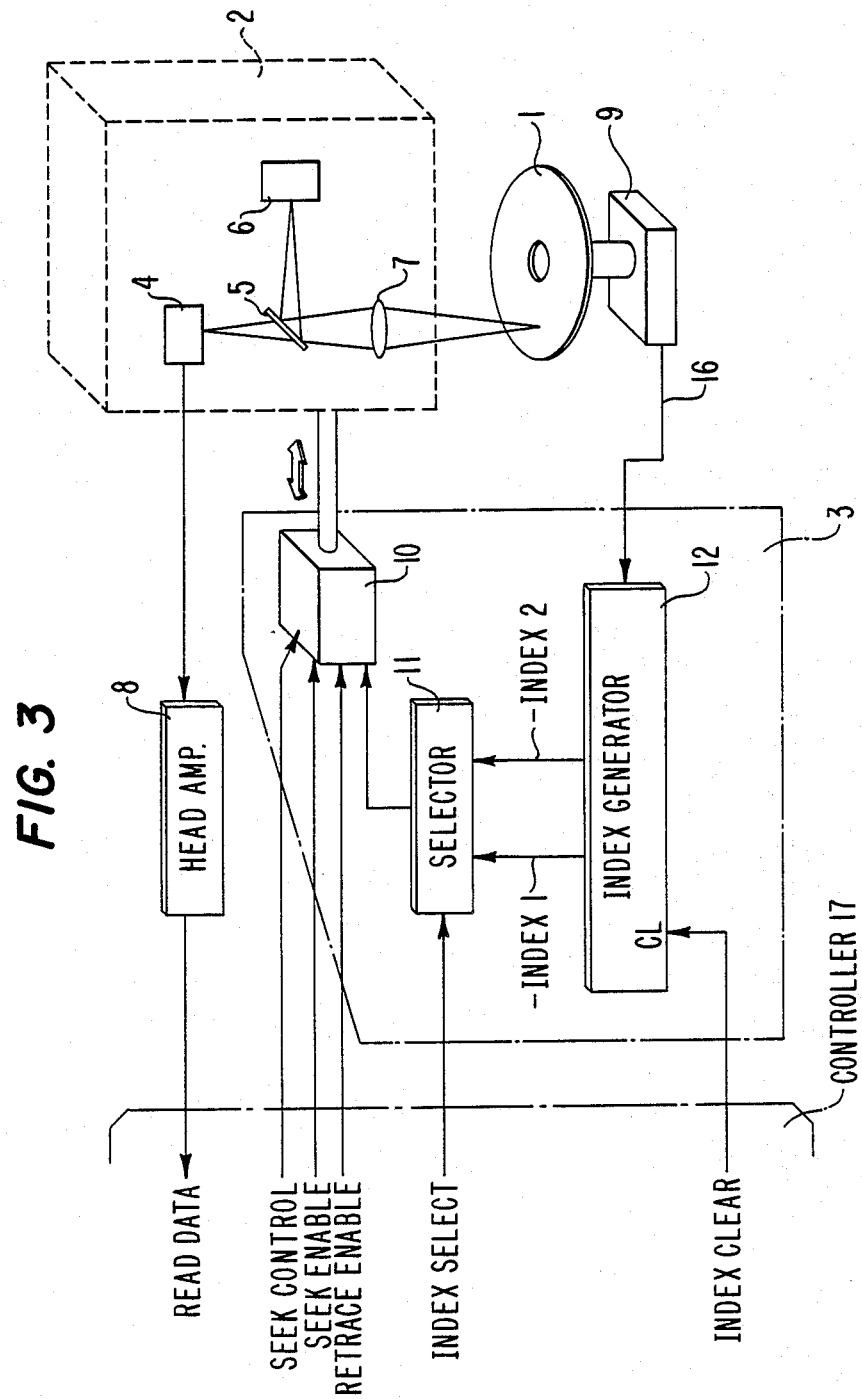
FIG. 3 is a block diagram of a disk-type storage medium recording/reproducing apparatus as a second embodiment of the invention.

FIG. 3 is a block diagram of a disk-type storage medium recording/reproducing apparatus as the second embodiment of the present invention.

* Detection of index pulse (II)

Figure 5:
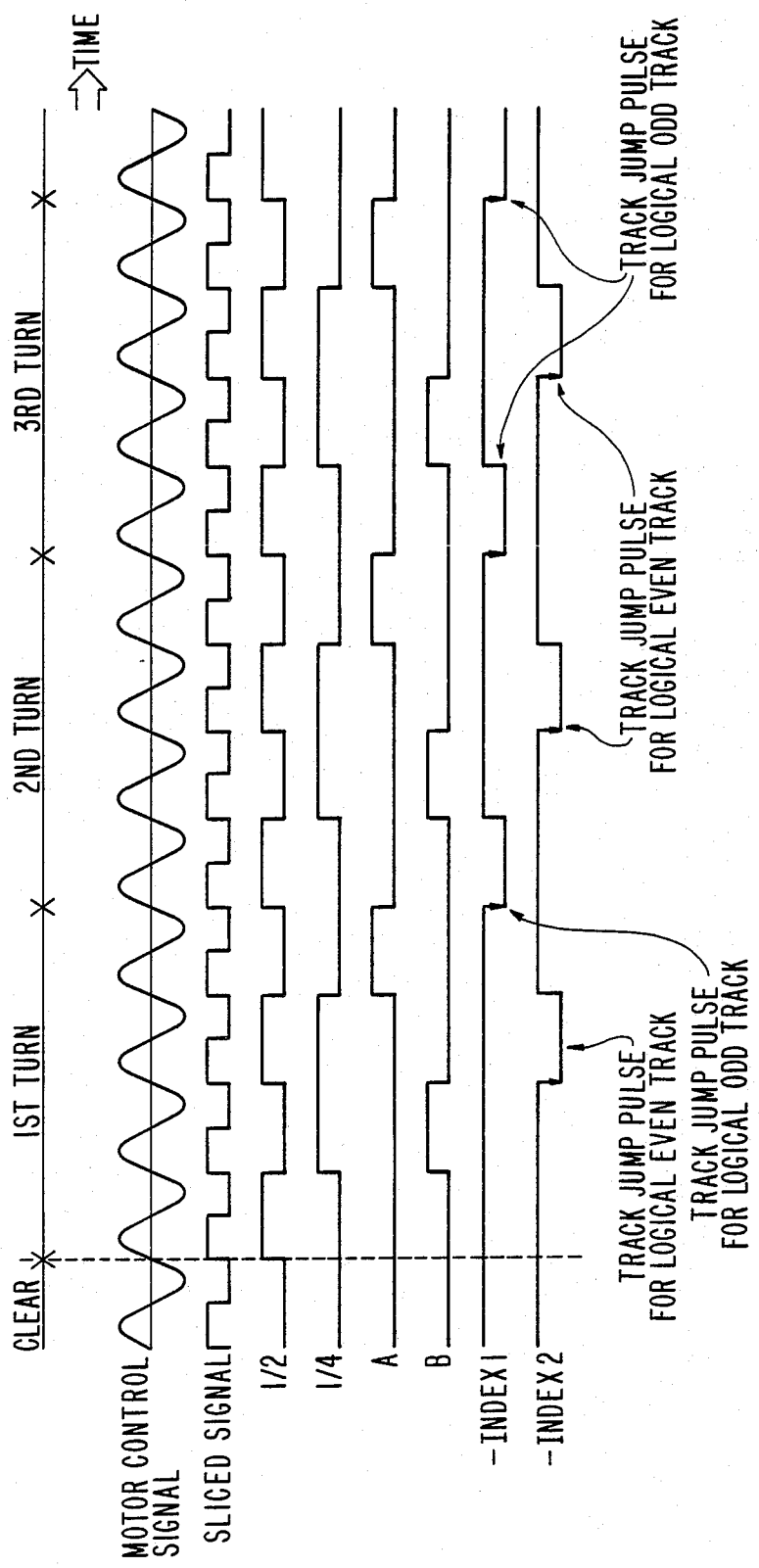
FIG. 5 is a timing chart of signals in the circuit of FIG. 4.

In FIG. 3, a storage medium 1 is so formated as shown in FIG. 8 similarly to the foregoing one used in the first embodiment. The difference of the second embodiment from the first embodiment resides in a part for detecting a boarder of the logical tracks and a part for forming an index pulse. In FIG. 3, the data detected by the component elements 13 through 15 in FIG. 1 is replaced by a control signal 16 for a motor 9. The motor control signal has an analog waveform as shown at the uppermost of the timing chart of FIG. 5. This waveform is obtained from a Hall element employed to control the rotation speed of the spindle motor 9 in FIG. 2. The rotary plate of the spindle motor is magnetized to have eight poles so that the Hall element produces a signal waveform of four cycles per rotation. However, if the waveform has a plurality of cycles synchronized with the rotation angle, generally it can be converted into an index signal, and therefore the number of cycles is not limited to four alone mentioned above. Furthermore, depending on the type of the motor, the above signal may be replaced with some control signal other than that obtained from a Hall element.

Figure 4:
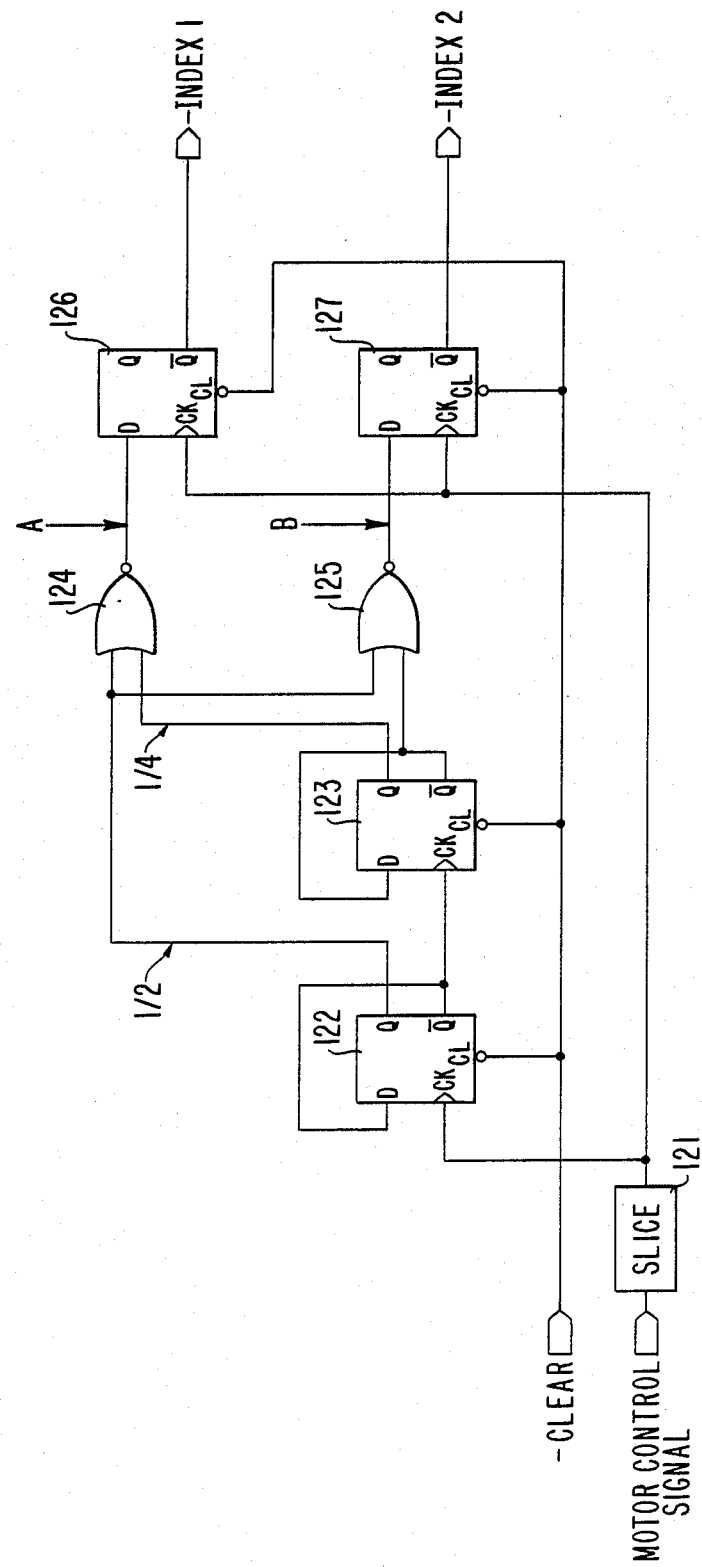
FIG. 4 is a circuit diagram of an index generator employed in the second embodiment.

The motor control signal from the Hall element is fed to an index generator 12 shown in FIG. 3. This generator is realized by a circuit of FIG. 4, whose operation is shown in the timing chart of FIG. 5. The motor control signal is waveform-shaped by a slice circuit 121 to be a sliced signal. This sliced signal is converted to a half frequency signal ½ by a flip-flop 122 and further to a quarter frequency signal ¼ by a flip-flop 123. From the half and quarter frequency signals, a pulse A occurring once per each turn is produced by a gate 124. From the half frequency signal and an inverted quarter frequency signal, a pulse B occurring once per each turn is produced by a gate 125. From the signals A and B, two index signals-index 1 and -index 2 are respectively produced by flop-flops 126 and 127. The two index signals -index 1 and -index 2 are outputted as shown in FIG. 4, and the negative edges of such two signals are used to determine the timing to start the retrace.

In the case of producing such index signals from some signal other than that defected directly from the storage medium 1, it needs to be noted that if the storage medium 1 can be unloaded from the spindle motor 9 structurally, the former positional relationship between the storage medium 1 and the spindle motor 9 is completely lost when the storage medium 1 is loaded again. That is, there exists the possibility of generating a completely different index signal at the timing to start the retrace. And it brings about a problem particularly when using a removable storage medium such as an optical disk. In order to solve this problem, the index generator 12 of FIG. 2 is equipped with a clear terminal in its circuit.

* Index clear

Figure 6:
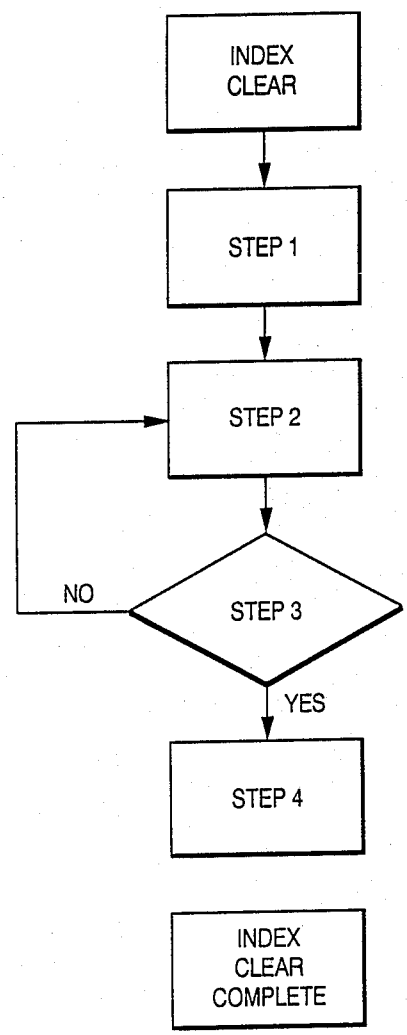
FIG. 6 is a flow chart showing the procedure to clear the index generator of FIG. 4.
Figure 7:
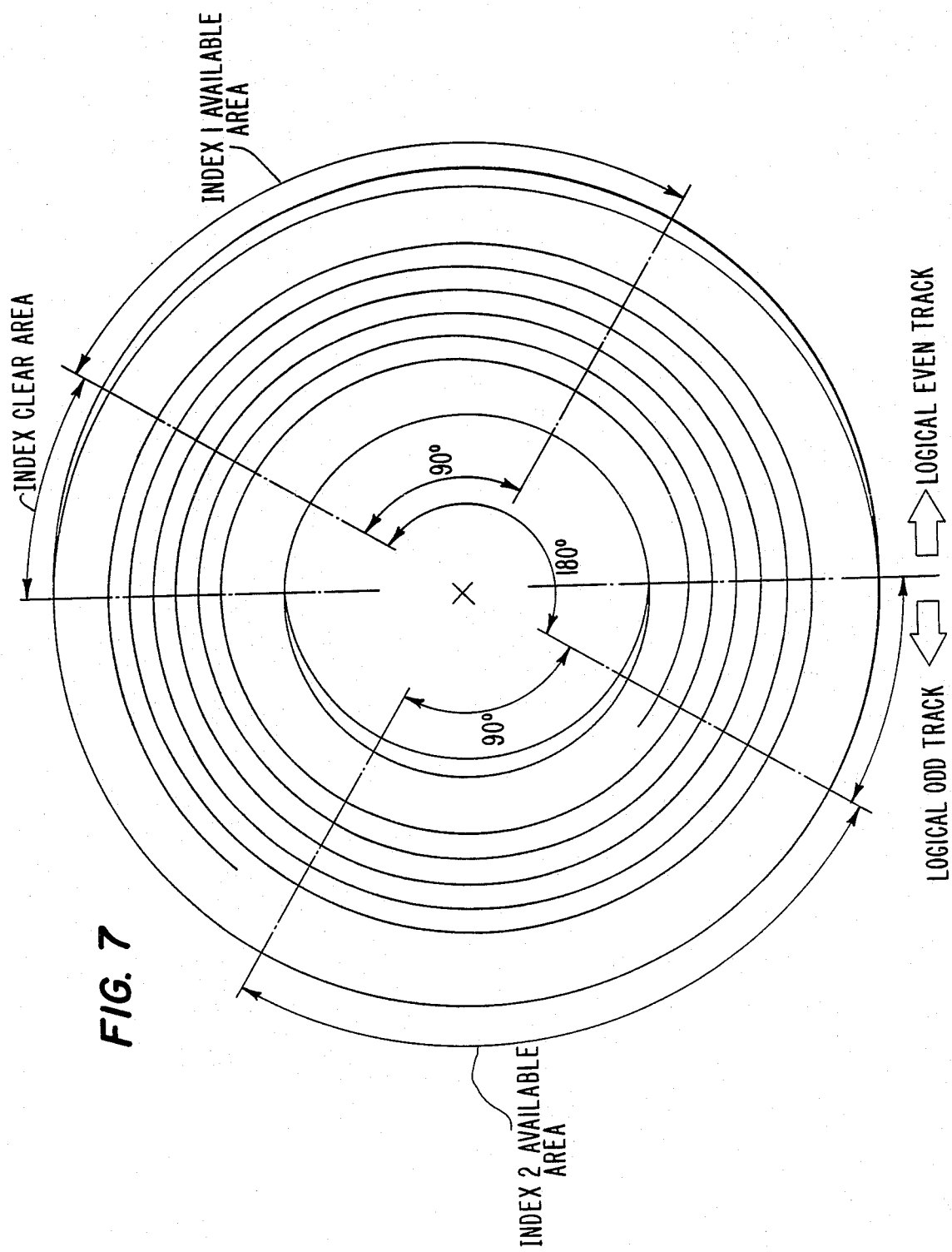
FIG. 7 illustrates areas where a reference signal for retrace is generated in the second embodiment.

How to use the clear terminal will now be described below with reference to the flow chart of FIG. 6. First in step 1, the storage medium 1 is loaded at random on the spindle motor 9. If the motor 9 is rotated in this state, an index signal fails to be generated at a proper timing in most cases from the Hall element. Therefore an arbitrary logical odd track is reproduced in step 2 and, after confirming the end of the logical odd track, the clear signal is rendered active in step 4 to execute synchronization of the index generator. The index signal thus synchronized comes to generate a negative edge without fail in the index available area on the storage medium shown in FIG. 7. However, the clear signal for such synchronization is released at the end of the index clear area in FIG. 7. As is obvious from FIG. 7, the remaining area for retrace is calculated as 180° - (index clear area) - (index available area). Since the index available area never exceeds 90° in the worst case, there still remains a sufficient margin for the retrace time. If necessary, a longer margin time is attainable by using such a spindle motor control signal that a greater number of waves are generated per rotation.

The process in the above individual steps corresponds to FIG. 6 as follows. Procedure of index clear Step 1: The storage medium 1 is loaded on the spindle motor 1.

Step 2: The sector number included in the sector content obtained through the head 2 and the head amplifier 8 is read out.

Step 3: Whether the sector address is the end or not of the logical odd track is checked.

Step 4: A clear pulse is applied to the index clear line.

* Other formats

Figure 9:
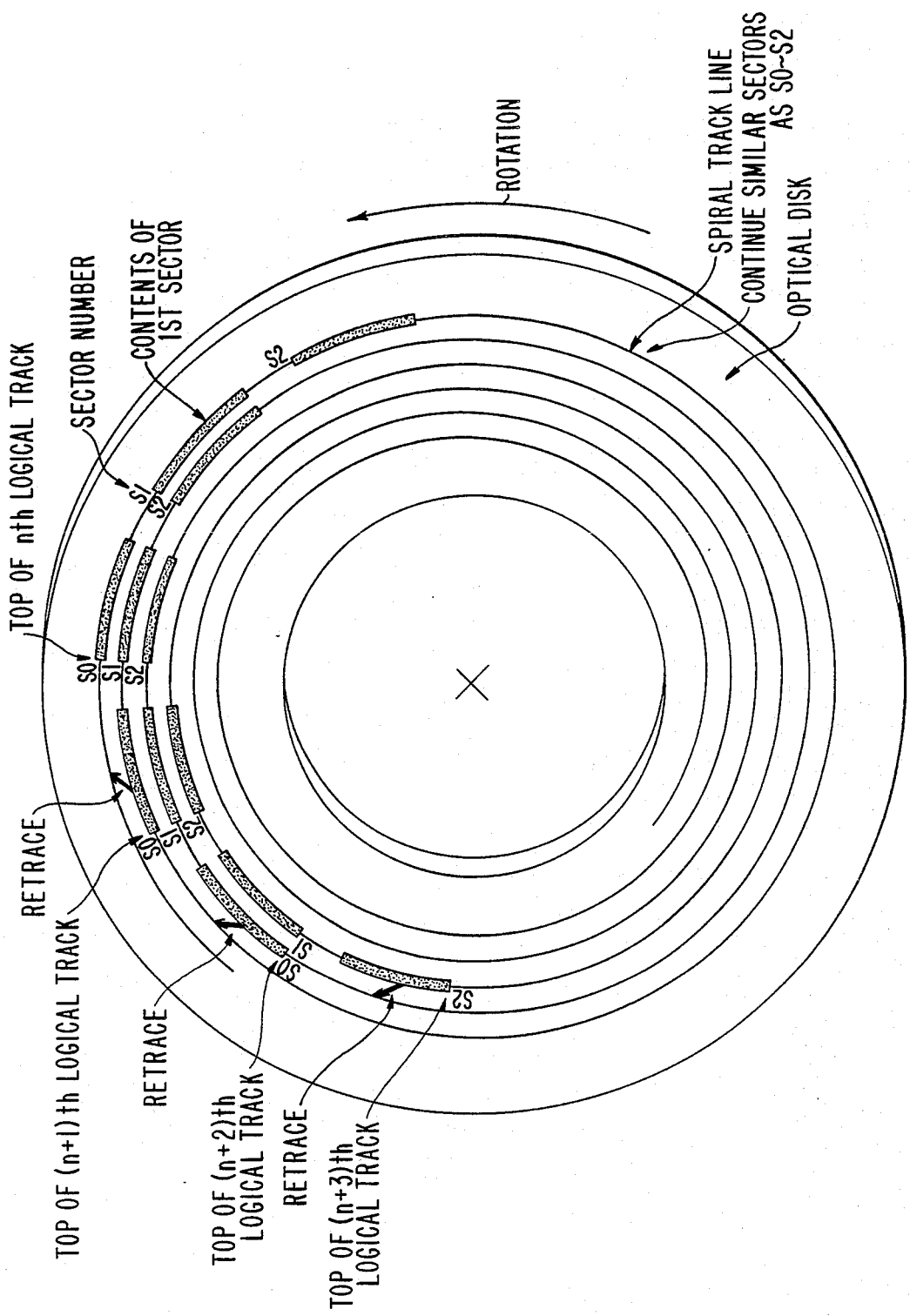
FIG. 9 illustrates another exemplary disk format of the invention.
Figure 10:
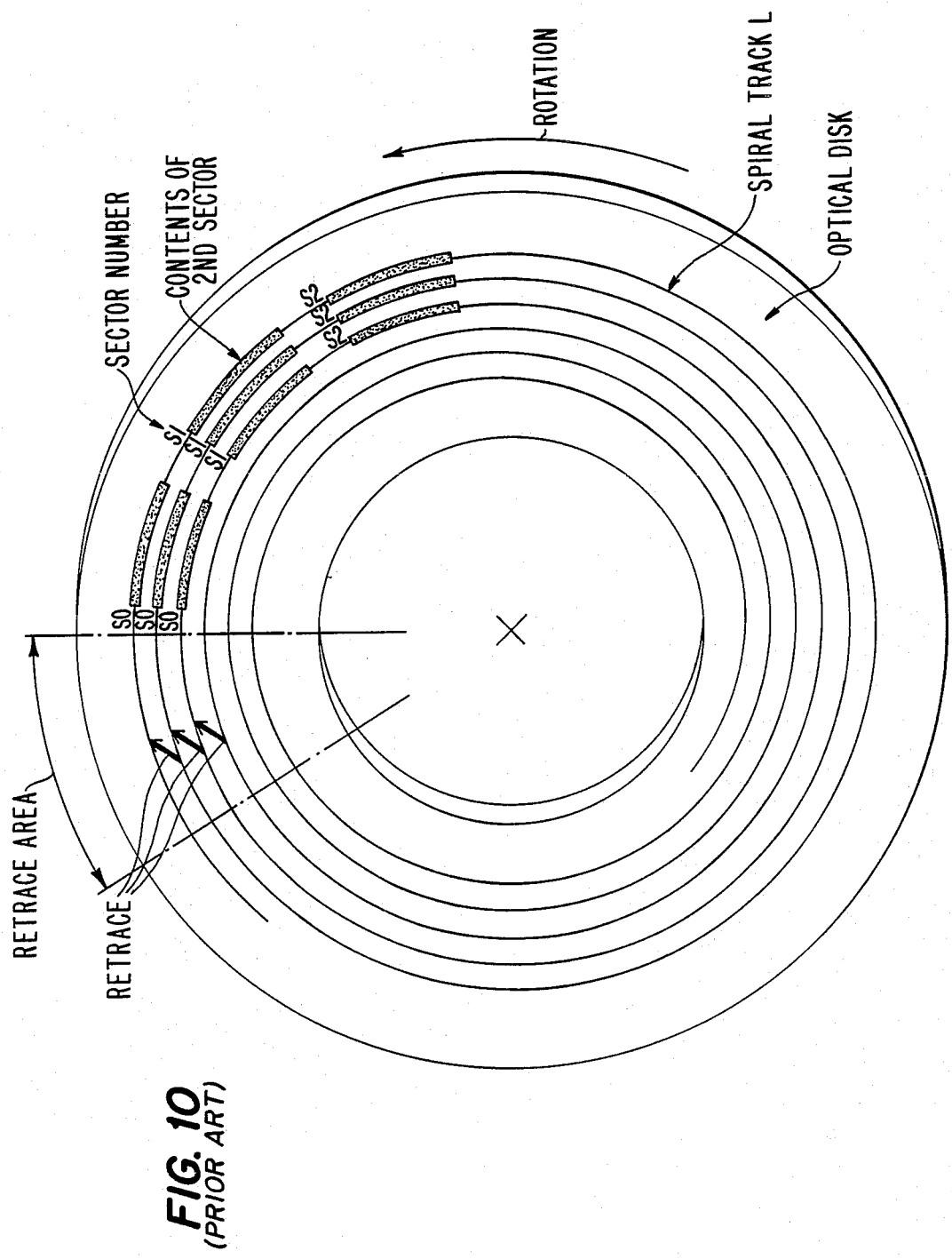
FIG. 10 illustrates a conventional disk format for execution of retrace.

FIG. 9 illustrates another format of a disk storage medium usable in an apparatus of a constitution similar to the embodiment mentioned above. In FIG. 9, spiral solid lines correspond to spiral tracks, and S0–S2 represent sectors. The difference of FIG. 9 from the example of FIG. 8 resides in the point that the top of a given logical track and the top of a next logical track have an angular difference of one sector instead of a half rotation of the disk. Similarly to the foregoing format of FIG. 8, the example shown in FIG. 9 has a feature that data can be recorded in the retrace area as well. However, in the format of FIG. 9, each logical track does not correspond to one rotation of the disk. Accordingly, in execution of the seek operation, the number of tracks crossed by the head fails to coincide with the number of logical tracks. It is therefore necessary to previously compensate the seek displacement. With regard to such a problem, the compensation is simpler in the format of FIG. 8. Since one physical track corresponds to two logical tracks in FIG. 8, the value obtained by halving the number of logical tracks to be sought may be established as a seek displacement.

In the format of FIG. 9, the top of each logical track has a angle deviation of one sector, from the top of the previous logical track, but generally the angle deviation is not limited to a length of one sector alone. The angle deviation may be such that the head can complete a track jump within the angle deviation.

The present invention has a further feature that, in the disk storage medium having spiral tracks, one track is defined to be smaller than the length of one rotation of the disk so that track data can be written even in the area required for retrace. This feature is still retained when the jump in the reverse direction covers a plurality of tracks. That is, one logical track may be defined as $(n \times 360) - \alpha$ degree, in which $n = 1, 2 \ldots, \alpha \geq$ (time required for retrace).

What is claimed is:

1. An information recording/reproducing apparatus comprising:
   a disk-type storage medium having a spiral track each one turn of which has a predetermined number of sectors, wherein said spiral track is divided into a plurality of subtracks each containing therein a smaller number of said sectors than said predetermined number, each sector in each subtrack having an identifier area for storing a track address showing an address of said each subtrack and a sector address showing an address of each said sector in said each subtrack;
   a rotating means for rotating said storage medium;
   a head for writing information data into said storage medium and reading recorded data from said storage medium;
   a head moving means for moving said head so as to traverse said spiral track, said head moving means normally moving said head in a forward direction so that said head traces said spiral track to write information data into or read recorded data from said storage medium; and
   a track jump control means for controlling said head moving means to execute a track jump for moving said head to jump in a backward direction after tracing a desired subtrack to trace again said desired subtrack.

2. An apparatus according to claim 1, wherein said track jump control means includes a pulse generating means for generating at least one pulse during one rotation of said storage medium, and an index signal generating means for generating from said pulse an index signal which serves as a timing signal to start a track jump.

3. An apparatus according to claim 2 wherein said rotating means comprises a motor, and a means for producing a motor control signal for controlling said motor, and wherein said track jump control means includes an index signal generating means for generating from said motor control signal an index signal which serves as a timing signal to start a track jump.

4. An apparatus according to claim 1, wherein said pulse generating means generates, during one rotation of said storage medium, fixed-frequency pulses having cycles greater in number than a number of said subtracks per turn of said spiral track.

5. An apparatus according to claim 1, wherein each of said subtracks extends for an angle of 180°.

6. An information recording/reproducing apparatus comprising:
   a disk-type storage medium having a spiral track each one turn of which has a predetermined number of sectors, wherein said spiral track is divided into a plurality of subtracks each containing therein a smaller number of said sectors than said predetermined number, each sector in each subtrack having an identifier area for storing a track address showing an address of said each subtrack and a sector address showing an address of said each sector in said each subtrack;
   a rotating means for rotating said storage medium;
   a head for writing information data into said storage medium and reading recorded data from said storage medium;
   a head moving means for moving said head so as to traverse said spiral track, said head moving means normally moving said head in a forward direction so that said head traces said spiral track to write information data into or read recorded data from said storage medium;
   a seeking means for checking the identification data read by said head and for controlling said head moving means according to the identification data to seek a desired subtrack from among said plurality of subtracks; and
   a track jump control means for controlling said head moving means to execute a track jump for moving said head to jump in a backward direction after tracing the desired subtrack to trace again said desired subtrack.

7. A disk-type storage medium having a spiral track each turn of which has a predetermined number of sectors, wherein said spiral track is divided into a plurality of subtracks each containing therein a smaller number of said sectors than said predetermined number, each sector in each subtrack having an identifier area for storing a track address showing an address of said each sector in said each subtrack.

8. A storage medium according to claim 7, wherein each of said plurality of subtracks extends for an angle of 180°.

* * * * *